(12) United States Patent
Strasser et al.

(10) Patent No.: US 10,291,093 B2
(45) Date of Patent: May 14, 2019

(54) CARRIER FOR COILS OF AN ELECTRIC MACHINE

(71) Applicant: AUDI AG, Ingolstadt (DE)

(72) Inventors: Roman Strasser, Gaimersheim (DE); Christian Westermaier, Markt Indersdorf (DE)

(73) Assignee: Audi AG, Ingolstadt (DE)

( * ) Notice: Subject to any disclaimer, the term of this patent is extended or adjusted under 35 U.S.C. 154(b) by 92 days.

(21) Appl. No.: 15/423,700

(22) Filed: Feb. 3, 2017

(65) Prior Publication Data

US 2017/0222512 A1 Aug. 3, 2017

(30) Foreign Application Priority Data

Feb. 3, 2016 (DE) .................. 10 2016 001 211

(51) Int. Cl.
*H02K 3/34* (2006.01)
*H02K 1/16* (2006.01)
*H02K 3/38* (2006.01)
*H02K 9/22* (2006.01)
*H02K 15/02* (2006.01)
*H02K 15/10* (2006.01)
*H02K 3/48* (2006.01)

(52) U.S. Cl.
CPC ............. *H02K 3/345* (2013.01); *H02K 1/16* (2013.01); *H02K 3/38* (2013.01); *H02K 9/22* (2013.01); *H02K 15/024* (2013.01); *H02K 15/10* (2013.01); *H02K 3/48* (2013.01)

(58) Field of Classification Search
CPC ............. H02K 3/345; H02K 3/38; H02K 1/16
USPC ............................................ 310/215; 29/596
See application file for complete search history.

(56) References Cited

U.S. PATENT DOCUMENTS

| 3,917,967 A | 11/1975 | Robinson et al. |
| 6,400,056 B1 * | 6/2002 | Naka ............... H02K 3/345 310/215 |
| 9,393,873 B2 | 7/2016 | Strasser |
| 2002/0047457 A1 * | 4/2002 | Yoshikawa ......... H02K 3/345 310/215 |
| 2007/0001525 A1 | 1/2007 | Schneider et al. |
| 2009/0091206 A1 | 4/2009 | Nissen |

(Continued)

FOREIGN PATENT DOCUMENTS

| CH | 409104 | 3/1966 |
| CN | 201008104 Y | 1/2008 |

(Continued)

OTHER PUBLICATIONS

European Search Report issued by the European Patent Office in European Application No. EP 17 15 3671 dated Jun. 23, 2017.

(Continued)

*Primary Examiner* — Hanh H Nguyen
(74) *Attorney, Agent, or Firm* — Henry M. Feiereisen LLC

(57) ABSTRACT

A carrier for coils of an electric machine includes a rotation-symmetrical carrier stack having laminations with axial slots which are configured to receive a wire of the coils. Adjacent ones of the slots are separated from one another by a slot wall. The carrier stack has circular end faces and is formed with slot openings for the slots. Electrically insulating material is applied upon at least the slot walls of at least one of the end faces to cover the slot walls at their end face and to electrically insulate the slot walls.

13 Claims, 2 Drawing Sheets

(56) References Cited

U.S. PATENT DOCUMENTS

2010/0264757 A1    10/2010   Asou et al.
2012/0009408 A1     1/2012   Stevens et al.
2012/0194028 A1     8/2012   Rhoads et al.

FOREIGN PATENT DOCUMENTS

| | | |
|---|---|---|
| CN | 102 931 738 | 2/2013 |
| CN | 203774895 U | 8/2014 |
| CN | 204376570 U | 6/2015 |
| DE | 37 12 226 | 10/1988 |
| DE | 20 2004 010 956 U1 | 12/2005 |
| DE | 10 2007 044 149 B3 | 6/2009 |
| DE | 10 2010 032 555 A1 | 7/2010 |
| DE | 10 2012 001 487 A1 | 8/2012 |
| DE | 10 2013 223 051 A1 | 5/2015 |
| EP | 1 241 774 | 9/2002 |
| FR | 2 247 842 | 5/1975 |
| JP | S58 130732 | 8/1983 |
| JP | S 59 110355 | 6/1984 |

OTHER PUBLICATIONS

English translation of European Search Report issued by the European Patent Office in European Application No. EP 17 15 3671 dated Jun. 23, 2017.

Chinese Search Report dated Aug. 28, 2018 with respect to counterpart Chinese patent application 2017100629962.

Translation of Chinese Search Report dated Aug. 28, 2018 with respect to counterpart Chinese patent application 2017100629962.

* cited by examiner

CARRIER FOR COILS OF AN ELECTRIC MACHINE

CROSS-REFERENCES TO RELATED APPLICATIONS

This application claims the priority of German Patent Application, Serial No. 10 2016 001 211.0, filed Feb. 3, 2016, pursuant to 35 U.S.C. 119(a)-(d), the disclosure of which is incorporated herein by reference in its entirety as if fully set forth herein.

BACKGROUND OF THE INVENTION

The present invention relates to a carrier for coils of an electric machine and to a method of making such a carrier.

It would be desirable and advantageous to provide an improved carrier for coils of an electric machine and to an improved method of making such a carrier to obviate prior art shortcomings.

SUMMARY OF THE INVENTION

According to one aspect of the present invention, a carrier for coils of an electric machine includes a rotation-symmetrical carrier stack including laminations having axial slots which are configured to receive a wire of the coils, with adjacent ones of the slots being separated from one another by a slot wall, the carrier stack having circular end faces and formed with slot openings for the slots, and electrically insulating material applied at least upon the slot walls of at least one of the end faces to cover the slot walls at their end face and to electrically insulate the slot walls.

In accordance with the present invention, a layer of electrically insulating material or insulation medium is thus applied at least upon the areas of the slot walls to thereby provide a coating on the end face of the carrier.

According to another advantageous feature of the present invention, the electrically insulating material can be arranged on the at least one of the end faces to completely cover and electrically insulate the at least one of the end faces. Thus, a layer of electrically insulating material is applied across the entire area of the at least one of the end faces to electrically insulate the at least one of the end faces. Advantageously, the electrically insulating material can be shaped to correspond to a shape of the at least one of the end faces. Thus, the electrically insulating material is applied coextensively or congruently with the at least one of the end faces.

According to another advantageous feature of the present invention, the electrically insulating material can be embodied as flat insulation paper.

According to another advantageous feature of the present invention, the electrically insulating material can be applied on an inner wall of each of the slots to cover and electrically insulate the inner wall.

According to another advantageous feature of the present invention, the electrically insulating material can be applied on the at least one of the end faces such that wire extending on the at least of the end faces outside of the slots between a first one of the slots and a second one of the slots is arranged on the electrically insulating material, with the wire forming part of a winding head. The electrically insulating material separates hereby the normally form-fittingly placed wire of the winding head from the carrier stack.

According to another advantageous feature of the present invention, the carrier can be constructed in the form of a stator or a rotor.

According to another advantageous feature of the present invention, the electrically insulating material can be thermally conductive. Thus, heat can be better dissipated from at least one of the end faces of the carrier stack. Electrically insulating material of this type, i.e. having properties that are both electrically insulating and thermally conductive, is designated as combined material and finds application in the electronic field. Such a combined material can be provided in the form of a film with these properties.

A carrier according to the present invention can find application in an electric machine that can operate as motor and/or generator. The carrier includes a rotation-symmetrical carrier stack with a plurality of laminations in which wire is placed and wound to form coils. Portions of the wire outside the slots form a winding head. Electrically insulating material in the form of insulation paper can be placed on one or both of opposite end faces so as to separate and electrically insulate the winding heads from the carrier stack.

According to another aspect of the present invention, a method of making a carrier for coils of an electric machine includes forming a rotation-symmetrical carrier stack with circular end faces by stacking a plurality of laminations having axial slots which are separated by slot walls and provided for receiving a wire of coils, and applying electrically insulating material at least upon the slot walls of at least one of the end faces to cover and electrically insulate the slot walls.

According to another advantageous feature of the present invention, the electrically insulating material can be shaped to correspond to a shape of the at least one of the end faces. The electrically insulating material or insulation medium as well as the end face of the carrier stack can be of circular shape and include holes for the slots. As described above, the electrically insulating material can be applied on at least one of the end faces of the carrier stack to produce a carrier according to the present invention.

According to another advantageous feature of the present invention, the electrically insulating material can be bonded onto the at least one of the end faces.

According to another advantageous feature of the present invention, electrically insulating material can be applied upon an inner wall of each of the slots. In this way, the inner wall of the slots is lined with electrically insulating material.

According to another advantageous feature of the present invention, the electrically insulating material can be applied on the at least one of the end faces such that wire extending on the at least of the end faces outside the slots between a first one of the slots and a second one of the slots is arranged on the electrically insulating material, with the wire forming part of a winding head. The first and second slots may be directly adjacent to one another and separated from one another by only a single common slot wall. Depending on the type of winding, it is possible, in addition or as an alternative, to arrange at least one further slot between the first and second slots. For example, in the case of an electric machine with three phases, there are two further slots between the first and second slots.

In accordance with a method according to the present invention, electrically insulating material or insulation medium is used for at least one winding head, normally for both winding heads. The electrically insulating material can be punched-out insulation paper for example, shaped to match the shape of the at least one of the end faces of the carrier stack. Thus, a winding head can be compressed to a greater extent in an axial direction, so that a power density of the electric machine requires less installation space while still maintaining a same power output.

When using, instead of a purely electrically insulating material, a combined material that combines electrically insulating and thermally conductive properties so that heat generated in the current-carrying wires of the winding heads is conducted to the carrier stack of laminations, the power output of the electric machine can be further enhanced.

The electrically insulating material can be easily placed upon the at least one of the end faces of the carrier stack and fixed, e.g. by adhesive, to the carrier stack. As a result, the electrically insulating material is prevented from shifting during winding of the coils.

In addition, it is possible to cast, e.g. by dripping, a still remaining gap between a carrier lamination as a stator lamination and a carrier lamination as rotor lamination. This also is able to enhance the power output of the electric machine.

A method according to the present invention can also be used for an electric machine, configured as separately excited synchronous machine having coils or windings in the carrier formed as rotor.

Insulation paper as an example of electrically insulating material can be placed as insulation into the slots of the carrier stack, before placing and/or winding of the wires, between the wires still to be inserted, e.g. copper wires, and the carrier stack and upon an end face of the carrier stack. Wires can thus be received in the slots without air gap and suitably wound. As a result, a corresponding winding head becomes also electrically insulated from the carrier stack. The winding head and the wires, which extend between the slots and form the winding head, can be placed directly and without the presence of an air gap upon the electrically insulating material, with the wires being thus separated from the end face of the carrier stack by the electrically insulating material. This saves installation space and improves heat transfer between the carrier stack and the winding head. There is no need to wrap the winding head with insulating material for effecting electric insulation.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
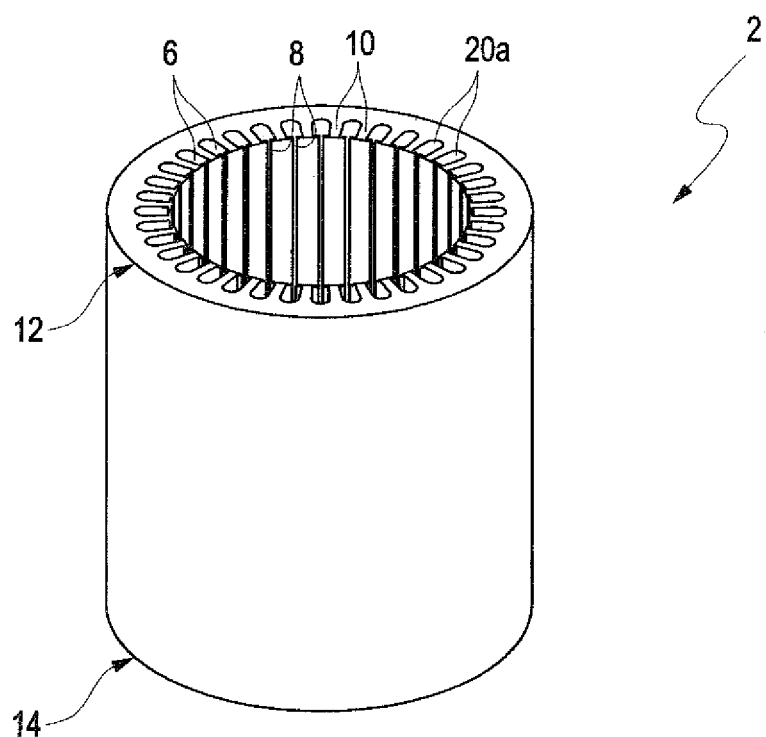
FIG. 1 is a schematic perspective view of a carrier stack as part of a carrier according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 3:
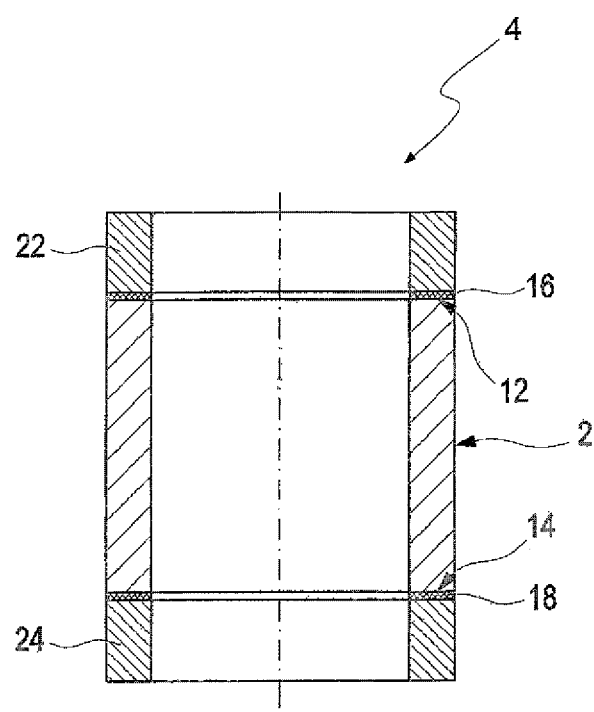
FIG. 3 is a sectional view of the carrier of FIG. 1.

Turning now to the drawing, and in particular to FIG. 1, there is shown a schematic perspective view of a carrier stack, generally designated by reference numeral 2 and having a rotation-symmetrical configuration, e.g. hollow-cylindrical configuration. The carrier stack 2 is a component of a carrier according to the present invention, as shown in FIG. 3 and generally designated in FIG. 3 by reference numeral 4. The carrier 4 can be used as a stator or rotor for an electric machine. The carrier stack 2 is comprised of a plurality of laminations which are stacked to form the carrier stack 2. Slots 6 with slot apertures 8 are formed on an inner wall of the carrier stack 2, with two directly adjacent slots 6 being separated from one another and/or connected to one another, depending on definition, by a slot wall 10. The carrier stack 2 has an upper end face 12 and a lower end face 14 which are both of circular configuration and have each slot openings 20*a*.

Figure 2:
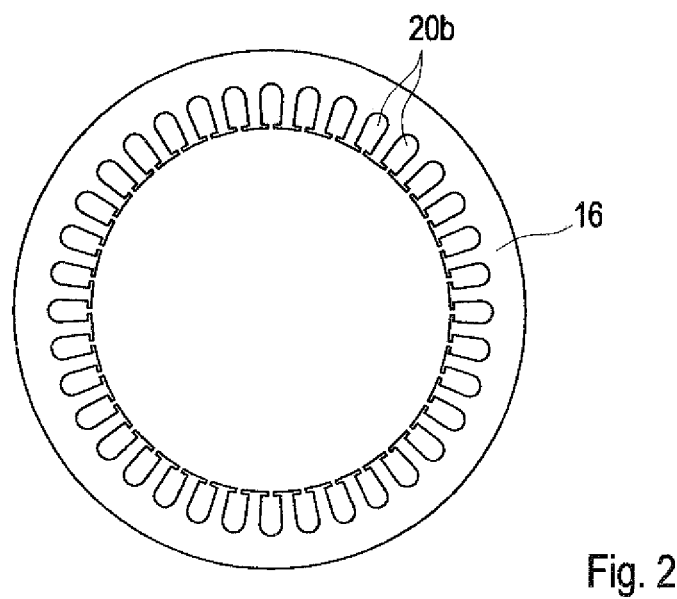
FIG. 2 is a plan view upon the carrier of FIG. 1.

As is readily apparent from FIG. 3, applied on each of the end faces 12, 14 is a layer 16, 18 of electrically insulating material to cover the end faces 16, 18. Advantageously, the layers 16, 18 are bonded to the end faces 12, 14, respectively, to thereby coat them. FIG. 2 shows by way of a plan view the presence of the layer 16 of electrically insulating material on the upper end face 12. FIGS. 2 and 3 illustrate together that the layers 16, 18 of electrically insulating material are shaped with a contour that matches a contour of the end faces 12, 14, respectively. By way of example and shown in FIG. 2, the layer 16 of electrically insulating material has a circular shape and includes openings 20*b* which are in registry with the slot openings 20*a* of the carrier stack 2.

While FIGS. 2 and 3 show a currently preferred embodiment of the carrier 4, involving an application of the layers 16, 18 of electrically insulating material to completely cover the corresponding end faces 12, 14, it is, of course, also within the scope of the present invention to apply the electrically insulating material just upon the slot walls 10 that separate the slots 6 to electrically insulate the slot walls 10.

When producing the carrier 4 (FIG. 3), also the inner walls of the slots 6 can be coated with electrically insulating material. Subsequently, wire is inserted in the slots 6, with wire extending between two slots 6 forming a first winding head 22 at the upper end face 12 and a second winding head 24 at the lower end face 14.

As is readily apparent from FIG. 3, the wire of each of the winding heads 22, 24 is arranged upon the layers 16, 18 of electrically insulating material, respectively, which in turn is bonded to the corresponding end faces 12, 14. As a result, the wire of each of the winding heads 22, 24 is electrically insulated from the carrier stack 2.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A carrier for coils of an electric machine, said carrier comprising:

a rotation-symmetrical carrier stack including laminations having axial slots which are configured to receive a wire of the coils, with adjacent ones of the slots being separated from one another by a slot wall, said carrier stack having circular end faces and formed with slot openings for the slots; and electrically insulating material applied at least upon one of the circular end faces of the carrier stack to completely cover and electrically insulate the at least one of the circular end faces and also upon the slot walls of the at least one of the circular end faces to cover the slot walls at their end face and to electrically insulate the slot walls, wherein the electrically insulating material applied upon the at least one of the circular end faces of the carrier stack is shaped to correspond to a shape of the at least one of the circular end faces of the carrier stack, with inner and outer circumferential surfaces of the electrically insulating material corresponding to inner and outer circumferential surfaces of the carrier track at the at least one of the circular end faces of the carrier stack.

2. The carrier of claim 1, wherein the electrically insulating material is embodied as insulation paper.

3. The carrier of claim 1, wherein the electrically insulating material is applied on an inner wall of each of the slots to cover and electrically insulate the inner wall.

4. The carrier of claim 1, wherein the electrically insulating material is applied on the at least one of the end faces such that wire extending on the at least of the end faces outside of the slots between a first one of the slots and a second one of the slots is arranged on the electrically insulating material, with the wire forming part of a winding head.

5. The carrier of claim 1, constructed in the form of a stator or a rotor.

6. The carrier of claim 1, wherein the electrically insulating material is thermally conductive.

7. The carrier of claim 1; further comprising a winding head applied on the insulating material at a side of the at least one circular end face of the carrier stack, wherein the winding head, the insulating material, and the carrier stack having outer circumferential surfaces with a same diameter.

8. The carrier of claim 1, wherein the inner and outer circumferential surfaces of the electrically insulating material and the inner and outer circumferential surfaces of the carrier stack at the at least one of the circular end faces of the carrier stack are circumferentially uninterrupted surfaces.

9. A method of making a carrier for coils of an electric machine, comprising:

forming a rotation-symmetrical carrier stack with circular end faces by stacking a plurality of laminations having axial slots which are separated by slot walls and provided for receiving a wire of coils;

applying electrically insulating material at least upon one of the circular end faces of the carrier stack to completely cover and electrically insulate the at least one of the circular end faces and also upon the slot walls of at least one of the circular end faces to cover and electrically insulate the slot walls; and shaping the electrically insulating material applied at least upon at least one of the circular end faces of the carrier stack to correspond to a shape of the at least one of the circular end faces of the carrier stack, with inner and outer circumferential surfaces of the electrically insulating material corresponding to inner and outer circumferential surfaces of the carrier stack at the at least one of the circular end faces of the carrier stack.

10. The method of claim 9, wherein the electrically insulating material is bonded onto the at least one of the end faces.

11. The method of claim 9, wherein the electrically insulating material is applied on the at least one of the end faces such that wire extending on the at least of the end faces outside the slots between a first one of the slots and a second one of the slots is arranged on the electrically insulating material, with the wire forming part of a winding head.

12. The method of claim 9; further comprising applying a winding head on the insulating material at a side of the at least one circular end face of the carrier stack, and forming the winding head, the insulating material, and the carrier stack with outer circumferential surfaces having a same diameter.

13. The method of claim 9, further comprising forming the inner and outer circumferential surfaces of the electrically insulating material and the inner and outer circumferential surfaces of the carrier at the at least one of the circular end faces of the carrier stack as circumferentially uninterrupted surfaces.

* * * * *